(Model.)

A. C. EVANS.
Corn Planter.

No. 241,129.   Patented May 10, 1881.

Attest,
W. M. Converse.
Ora Converse.

Inventor
Austin C. Evans
B. C. Converse, Atty.

(Model.)
A. C. EVANS.
Corn Planter.
No. 241,129.
2 Sheets—Sheet 2.
Patented May 10, 1881.
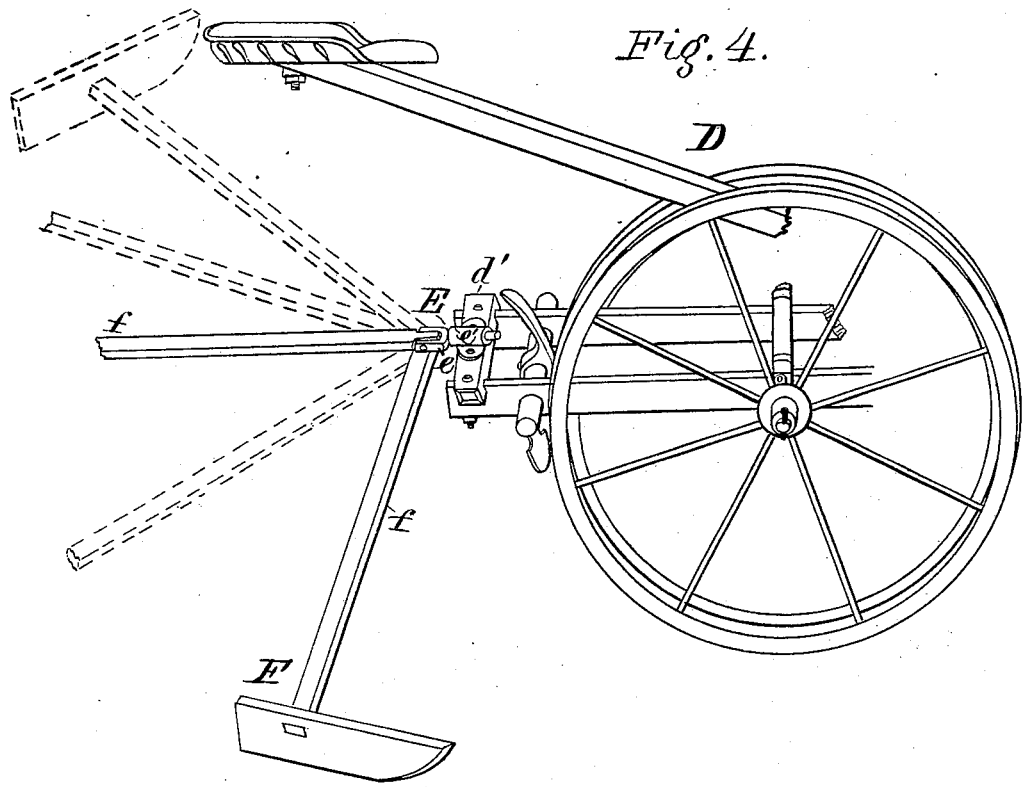
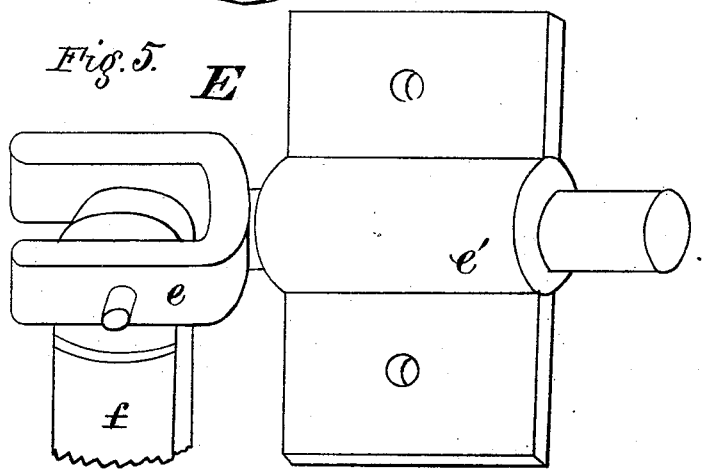
Attest
M. M. Converse
Ora Converse
Inventor:
Austin C. Evans
B. C. Converse, Atty.
N. PETERS, Photo-Lithographer, Washington, D. C.

UNITED STATES PATENT OFFICE.

AUSTIN C. EVANS, OF SPRINGFIELD, OHIO.

CORN-PLANTER.

SPECIFICATION forming part of Letters Patent No. 241,129, dated May 10, 1881.

Application filed November 15, 1880. (Model.)

*To all whom it may concern:*

Be it known that I, AUSTIN C. EVANS, of the city of Springfield, in the county of Clarke and State of Ohio, have invented a new and useful Improvement in Corn-Planters, of which the following is a specification.

My invention relates to a wheeled planter; and it consists in certain improvements in the dropping devices both in the seed-disk and the devices connected therewith, whereby the dropping is more certain and greater regularity of discharge is effected, as the locking of the operative parts at any point by a partial stroke of the lever is entirely prevented, as will be hereinafter more fully set forth and specifically claimed.

Figure 1:
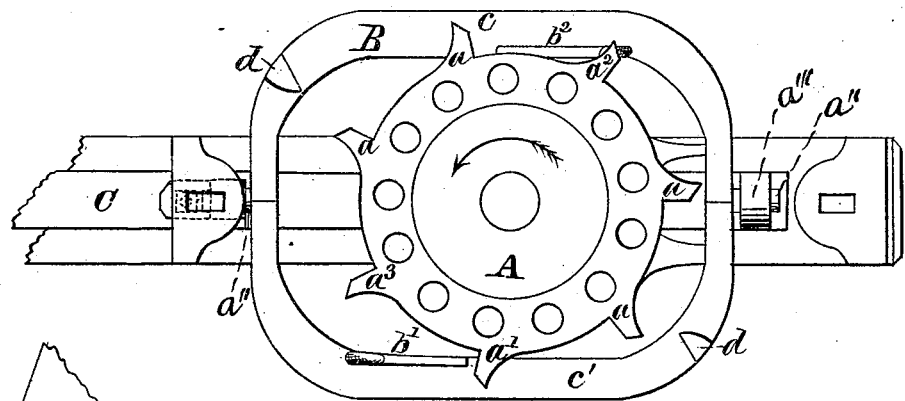
Figure 2:
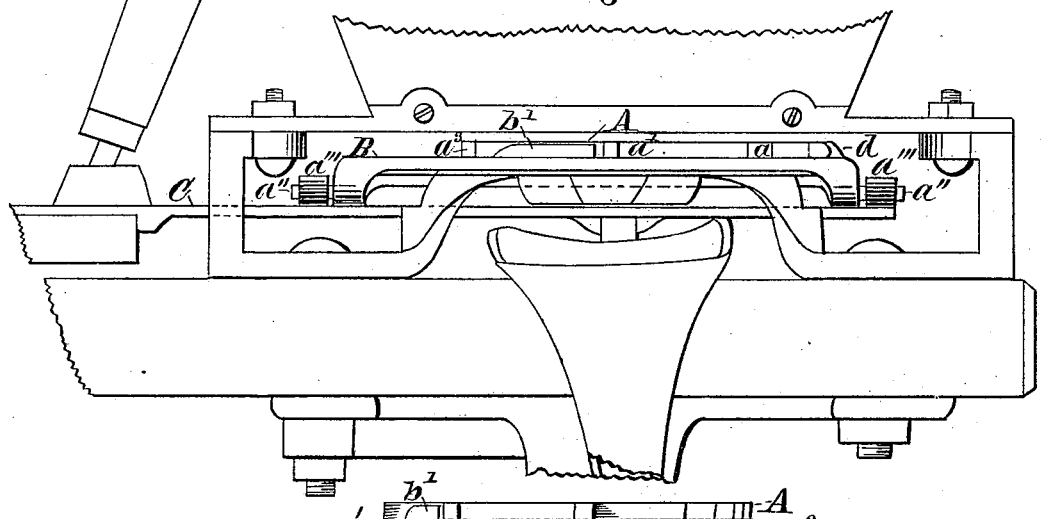
Figure 3:
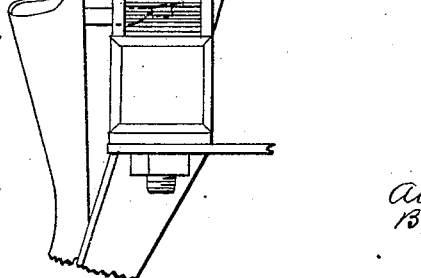

Figure 1 is a plan view of the seed-disk and its connections, the seed-box being removed. Fig. 2 is a longitudinal elevation of the same, a portion of the base of the seed-box being shown. Fig. 3 is an end view of the device as shown in Fig. 1. Fig. 4, Sheet 2, is a side elevation of the rear portion of a planter having my improved marker attachment connected therewith; Fig. 5, the coupling enlarged.

In the views, A is the seed plate or disk, which is provided, as usual, with seed-cells, and from its edge extend the long teeth $a\ a'$. It lies over an open oblong frame, B, having journals $a''$ extending centrally from its ends, upon which it is pivoted in boxes $a'''$ on the ends of the actuating slide-lever C. As the latter is reciprocated each side bar of frame B alternately rises and falls, as seen in the dotted lines, Fig. 3. This oscillatory movement is caused during the passage of the frame under the disk by the long raised lugs $b'$ and $b^2$ seen on each side bar of the frame. The front ends of the lugs are vertical, to push against the face of tooth $a$ of the disk. The rear ends slope off, so as to allow them to readily pass under the tooth of the disk, and thereby depress the side bar opposite to the driving side (see Fig. 1, the top bar of which corresponds with the depressed bar seen on the right in Fig. 3) as the frame B is reciprocated back and forth.

By reference to Fig. 1 it will be noticed that when the frame is pushed to the right by the action of the slide-lever the lower long lug, $b'$, strikes the face of tooth $a'$, rotating the disk to the left, and that the tooth $a^2$ slides over the lug $b^2$ on the upper or depressed bar of the frame, the right or rear end being beveled or sloped off for that purpose. As soon as the tooth $a^2$ has arrived at the left end of the lug (which is at right angles to the plane of the bar) the latter rises, bringing the lug up between tooth $a^2$ and the next on the right of the disk, and so on in the order of rotation. At the point where lug $b^2$ on the upper frame-bar, $c$, rises, between $a^2$ and the next tooth to the right, frame B will have reached the end of the stroke, and this side now becomes the driving side, lug $b^2$ on it pushing against the face of tooth $a^2$ as the slide-lever is thrown to the left, and tooth $a^3$ now slides over the lug $b'$ on the lower frame-bar, $c'$, (the rear or sloping end of which is at the left,) in precisely the same manner. It will be seen by reference to this figure and to Figs. 2 and 3 that during any partial stroke of the lever one of the lugs $b'$ or $b^2$ must be under a tooth of the disk, and that it is impossible to lock the parts under any circumstances, and also that the drop will not take place till the lever arrives at the end of a full stroke.

A stop of triangular shape is seen in Fig. 1 at the left upper and right lower corner of the frame B. These stops $d$ are about the same height of the lugs $b$—i. e., about equal to the thickness of the disk A. They serve to catch the rear of the driven tooth at the end of the stroke and prevent the plate from rotating too far. The point of each tooth of the disk is beveled to correspond with the inner angle of the stop, so as to allow them to pass as the disk receives its next impulse. The oscillatory motions of frame B are automatic, certain, and positive, and as the power is applied at the extreme verge of the disk, against the face of its extended tooth $a$ on each side alternately, the device is easily operated and is very accurate in its work. In Figs. 2 and 3 the connection of slide-lever C with the oscillating frame B above and the tubular seed-valve is seen. In the latter figure the connection with the valve is shown in dotted lines.

D is the rear of a planter-frame; $d'$, the rear bar of the same. On the top of this bar, at the middle of the same, is bolted a swiveled coupling, E, consisting of a fork, $e$, and a tubular sleeve, $e'$, having flanges on each side, by which it is bolted to the frame-bar $d'$ in line with the planter-frame. The fork $e$ has a cylindrical shank and turns easily in the sleeve. The pole or bar $f$ of the marker has its inner end pivoted in the fork by a pin, so that it can be placed in any position, as shown in the line and angular positions and in the positions shown in the dotted lines in Fig. 4. Instead of the usual rigid attachment, which allows the marker to assume only its operative positions on either side, this coupling allows the marker to be thrown in any desired direction, and also permits of its being folded upon the frame of the machine.

I am aware that swiveled couplings as applied to other purposes are not new.

I claim as my improvement—

1. In a rotary seed-dropping device for planters, the elongated teeth $a$ of the seed-disk A, having their ends inclined or beveled on their face sides near the point for the purpose of facilitating their disengagement from the triangular stops $d$ on the oscillating frame B as the device is operated.

2. In a rotary seed-dropping device for planters, an oblong frame pivoted in bearings on the end of the slide-lever, in line therewith, said frame being interposed between the seed-disk and the discharging-valve and adapted to have an oscillating movement, whereby its lugs $d$ are made to engage with the teeth of the seed-disk on opposite sides alternately, as and for the purpose hereinbefore set forth.

3. In a rotary seed-dropping device for planters, a slide-lever having bearings or boxes on the ends of the same, in line therewith, for the pivot ends of an oscillating frame journaled therein, as and for the purpose hereinbefore set forth.

4. In a rotary seed-dropping device, the combination, with a seed-disk constructed as described, of an oblong oscillating frame provided with raised lugs adapted by the rising and falling movements of the side bars of said frame, on either side alternately, to engage the teeth of the seed-disk and rotate the same, as hereinbefore specified, at each thrust of the slide-lever.

5. In a rotary seed-dropping device for planters, an oblong oscillating frame pivoted centrally in line of the slide-lever in bearings thereon, having a long elevated lug on the top of the same near the inside edge of each side bar, with a vertical front end, and its rear end sloped off, so as to allow its front end to engage the face of the teeth of the seed-disk when elevated, by the motion of the frame, to the same plane, and to allow it to pass under the teeth of said disk when depressed below it on either side alternately as the device is operated.

6. In a rotary seed-dropping device for planters, the combination of a seed-disk, A, having elongated bevel-ended teeth $a$, an oblong oscillating frame, B, having the long driving-lugs $b'$ and $b^2$ and the triangular stops $d$ cast thereon, pivoted in bearings on the slide-lever C beneath said disk, and adapted to operate the same from each side alternately by the actuation of said lever, as and for the purpose set forth.

AUSTIN C. EVANS.

Attest:
B. C. CONVERSE,
L. HOLMAN.